Dec. 16, 1941.                G. VOGT                 2,266,105
                        SAWTOOTH WAVE GENERATOR
                        Filed Nov. 14, 1939              2 Sheets-Sheet 1

INVENTOR
GOTTFRIED VOGT
BY
ATTORNEY

Dec. 16. 1941.          G. VOGT          2,266,105
SAWTOOTH WAVE GENERATOR
Filed Nov. 14, 1939          2 Sheets-Sheet 2

INVENTOR
GOTTFRIED VOGT
BY H. S. Smoot
ATTORNEY

Patented Dec. 16, 1941

2,266,105

UNITED STATES PATENT OFFICE 2,266,105

SAWTOOTH WAVE GENERATOR

Gottfried Vogt, Berlin, Germany, assignor to Telefunken Gesellschaft für Drahtlose Telegraphie m. b. H., Berlin, Germany, a corporation of Germany Application November 14, 1939, Serial No. 304,302
In Germany July 27, 1938

3 Claims. (Cl. 172—281)

This invention is concerned with the generation of alternating potentials of low frequency, particularly sawtooth, ratchet or relaxation-wave potentials.

The invention is of particular value where the problem involved is to generate ratchet potentials whose linear rise or upstroke is to be proportional to the angle of rotation of a rotating device such as a goniometer, condenser, and the like. Ratchet potentials of this kind are, for instance, required whenever regularly recurrent or periodic actions of an electrical nature which are caused by the rotation of such a device, are to be viewed and observed in an oscillograph tube in the form of a standing or stationary pattern, as is true, for example, of the measurement of phase angles.

According to prior practice, potentials appropriate therefor have been produced by impressing upon a potentiometer a D. C. potential which operates as the deflection potential of the cathode ray device and by impressing the latter potential upon the deflection or time-base means of the oscillograph tube by means of a switch synchronized with the revolving device. It will be seen that because of the requisite high potentials such an arrangement is not suitable and serviceable for routine operations and use.

Now, according to the invention it is suggested to generate a voltage of a suitable wave shape, preferably mechanically, and to use the same for modulating an auxiliary wave, following which the modulated wave is amplified and rectified. The carrier wave may then be filtered out. The desired useful or signal potential may be a low frequency of any desired voltage form.

For a better understanding, exemplified embodiments of the invention shall now be described in more detail by reference to the appended drawings, in which Fig. 1 is one embodiment of my invention.

Figure 1:
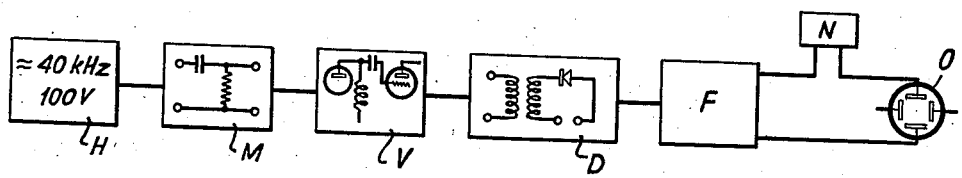

Fig. 1 is a basic outline of the circuit organization according to the invention. Generator H produces the carrier frequency of, say, 40 kc. This wave is modulated in modulator M with the ratchet or sawtooth potential generated mechanically. The modulated wave is conveniently amplified in the resonant amplifier V and then fed to the rectifier stage D. The rectified wave is then passed through the filter circuit F designed for a suitable band pass width and finally through a stage N tube to the deflection means of the Braun tube O, the stage N having a D. C. voltage component which determines the origin of the point of impact of the cathode ray beam in the Braun tube.

Figure 2:
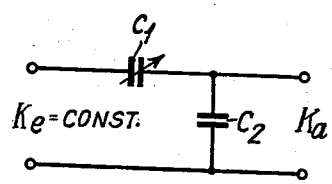
Fig. 2 is an arrangement for producing a sawtooth potential.
Figure 3:
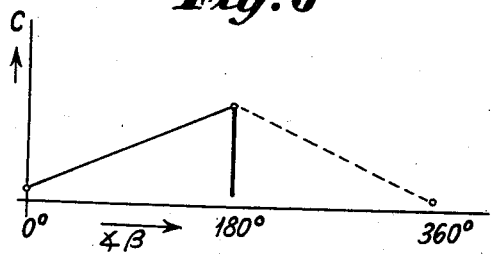
Figs. 3 and 4 are explanatory curves.

Fig. 2 explains the basic idea underlying the arrangement for the production of the sawtooth potential.

As can be seen from Fig. 2, a capacitive voltage divider comprising a variable condenser $C_1$ and a fixed condenser $C_2$ is connected with the constant voltage source $K_e$, output potential $K_a$ being taken off across the fixed condenser.

Figure 4:
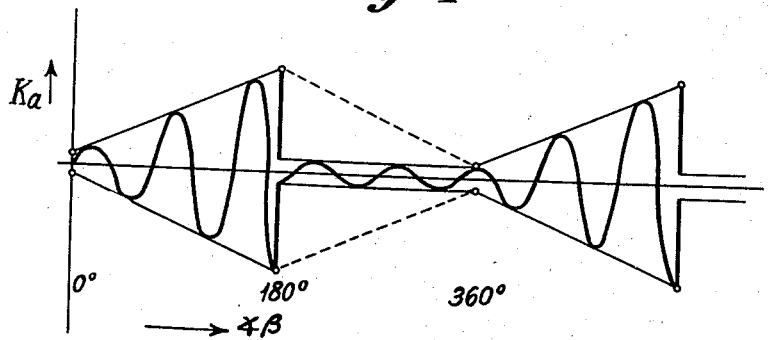

Fig. 4 explains the variation of the capacity of the condenser $C_1$ as a function of the angle of rotation $\beta$. The capacity of the condenser $C_1$ varies in accordance with a straight-line law up to $\beta=180$ degrees, whereupon it drops linearly between $\beta=180$ and $\beta=360$ degrees. When $\beta=180$ degrees the condenser is disconnected. The effect of the capacity variation upon the carrier wave, in other words, the modulation of this wave, is illustrated in Fig. 4 which illustrates the case where the condenser stays disconnected during the second half of the rotation of the condenser shaft.

Figure 5:
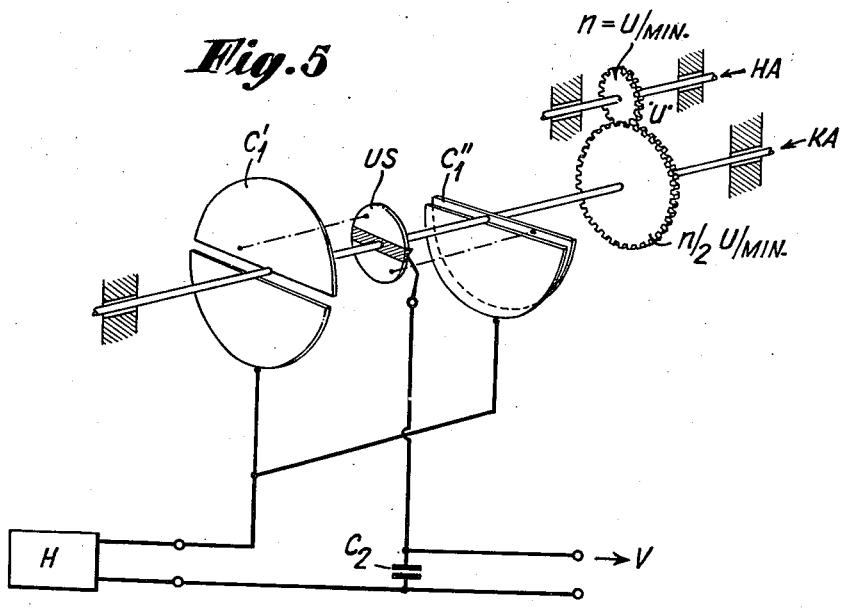
Fig. 5 is the condenser and drive arrangement.

However, since the rise of voltage for the sawtooth should occur linearly from zero up to 360 degrees, two condensers $C'_1$ and $C''_1$ as shown in Fig. 5 are used. The plate position of these condensers relative to each other is shifted an angle of 180 degrees. The condensers are driven from the main drive shaft HA by the gearing so that the condenser shaft KA revolves only at one-half the speed of rotation. Mounted also upon the shaft is a change-over switch US designed to cut off condenser $C'_1$ as soon as it has been interleaved all the way from zero to 180 degrees, while cutting in circuit condenser $C''_1$.

Figure 7:
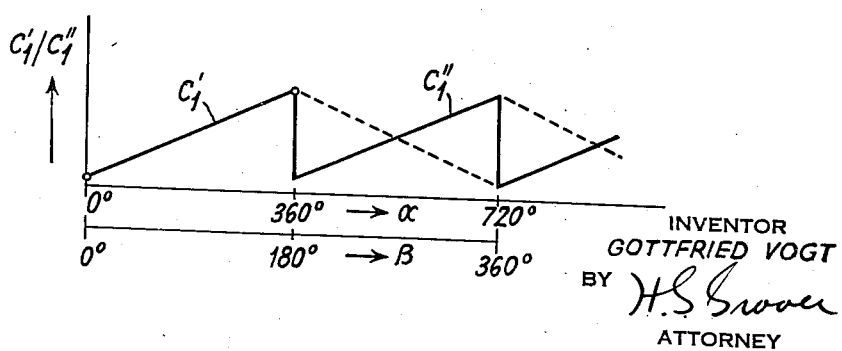
Fig. 7 is an explanatory curve.

The shape of the capacity curve for the double or twin condenser as a function of the rotation of the main shaft or the condenser shaft (main shaft angle $a$ and condenser shaft angle $\beta$) is illustrated in Fig. 7.

Figure 6:
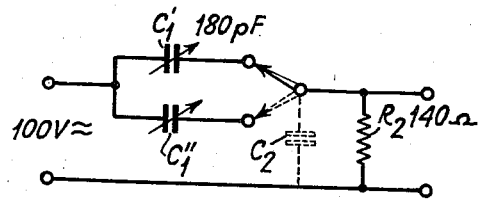
Fig. 6 is a time constant circuit arrangement.

In order that the return or downstroke of the sawtooth may be as speedy as possible and so that no retardation may be introduced by time constant circuits, it will be found preferable to replace the condenser $C_2$ of the arrangement by a resistance $R_2$ as shown in Fig. 6. What must also be kept in mind is that the alternating-current resistance or impedance of the control condenser should be high as compared with the tap resistance ($R_2$) in order that conditions may be made favorable for as straight and linear a rise of the ratchet voltage as possible.

The choice of the carrier frequency is governed by the demands for linearity and the time of the return stroke period. The best basis to determine this is by means of a Fourier series into which the ratchet frequency is resolved. Inasmuch as the carrier is filtered out after rectification it will be found expedient to choose the carrier frequency somewhat higher and to thereupon fix the upper limit or cut-off of the filter pass slightly higher than the highest frequency required for a perfect reproduction of the sawtooth wave. It will be obvious that the resonant amplifier must possess the necessary band pass width also. The best plan as shown in the circuit diagram Fig. 5 is to insure rectification in a voltage-doubling circuit organization.

What I claim is:

1. An apparatus for producing a sawtooth potential whose amplitude varies in accordance with the degree of rotation of a rotatable member comprising electrostatic storage means fixedly related to said rotatable member and rotated thereby, and means for interrupting the storage of energy in said electrostatic storage means intermittently.

2. Apparatus in accordance with claim 1 wherein said electrostatic storage means comprise a pair of condensers adapted to be charged by a common source, said condensers being positioned substantially 180° apart, and commutating means for intermittently charging each of said condensers.

3. Apparatus for producing a sawtooth wave in accordance with the angle of rotation of a rotatable member comprising electrostatic storage means adapted to be rotated by said rotatable member and to have the capacity thereof varied in accordance with the rotation, means for storing energy in said electrostatic storage means, a source of carrier frequency, means for modulating said carrier in accordance with the energy stored in the storage means, an amplifier resonant to the frequency of said carrier frequency, and adapted to have the modulated carrier wave impressed thereon, means for rectifying the output of said resonant amplifier, and means for filtering said rectified wave.

GOTTFRIED VOGT.